United States Patent [19]

Watson et al.

[11] 4,302,310

[45] Nov. 24, 1981

[54] RADIAL FLOW ELECTROFILTER

[75] Inventors: Frederick D. Watson; Weldon D. Mayse; Albert D. Franse, all of Houston, Tex.

[73] Assignee: Petrolite Corporation, St. Louis, Mo.

[21] Appl. No.: 85,367

[22] Filed: Oct. 16, 1979

[51] Int. Cl.³ .................. B03C 5/00; B03C 5/02
[52] U.S. Cl. ........................... 204/186; 204/188; 204/302
[58] Field of Search ............... 204/302–308, 204/272, 186, 188

[56] References Cited

U.S. PATENT DOCUMENTS

| | | | |
|---|---|---|---|
| 2,573,967 | 11/1951 | Hamlin | 204/184 |
| 3,252,885 | 5/1966 | Griswold | 204/302 |
| 3,324,026 | 6/1967 | Waterman | 204/302 |
| 3,394,067 | 7/1968 | Shirley | 204/180 |
| 3,567,619 | 3/1971 | Brown | 204/302 |
| 3,799,856 | 3/1974 | Franse | 204/188 |
| 3,799,857 | 3/1974 | Franse | 204/188 |
| 3,891,528 | 6/1975 | Griswold | 204/186 |
| 3,928,158 | 12/1975 | Fritsche | 204/188 |
| 3,980,541 | 9/1976 | Aine | 204/302 |
| 4,040,926 | 8/1977 | Oberton | 204/186 |
| 4,045,326 | 8/1977 | King | 204/302 |
| 4,059,498 | 11/1977 | Crissman | 204/188 |
| 4,066,526 | 1/1978 | Yeh | 204/302 |

*Primary Examiner*—T. M. Tufariello
*Attorney, Agent, or Firm*—Sidney B. Ring; Hyman F. Glass

[57] ABSTRACT

A radial flow electrofilter having a plurality of parallel planar horizontal electrodes. The filter may be provided with backflush means, in which case the filter medium preferably consists of non-deformable particles, or else a removable filter pack, preferably employing polyurethane foam, may be employed. In operation, finely divided solids, contained in a liquid of low electrical conductivity, may be efficiently removed by passing the liquid radially through the filter, while subjected to a unidirectional current electric field, from the periphery of the filter toward its center.

12 Claims, 4 Drawing Figures

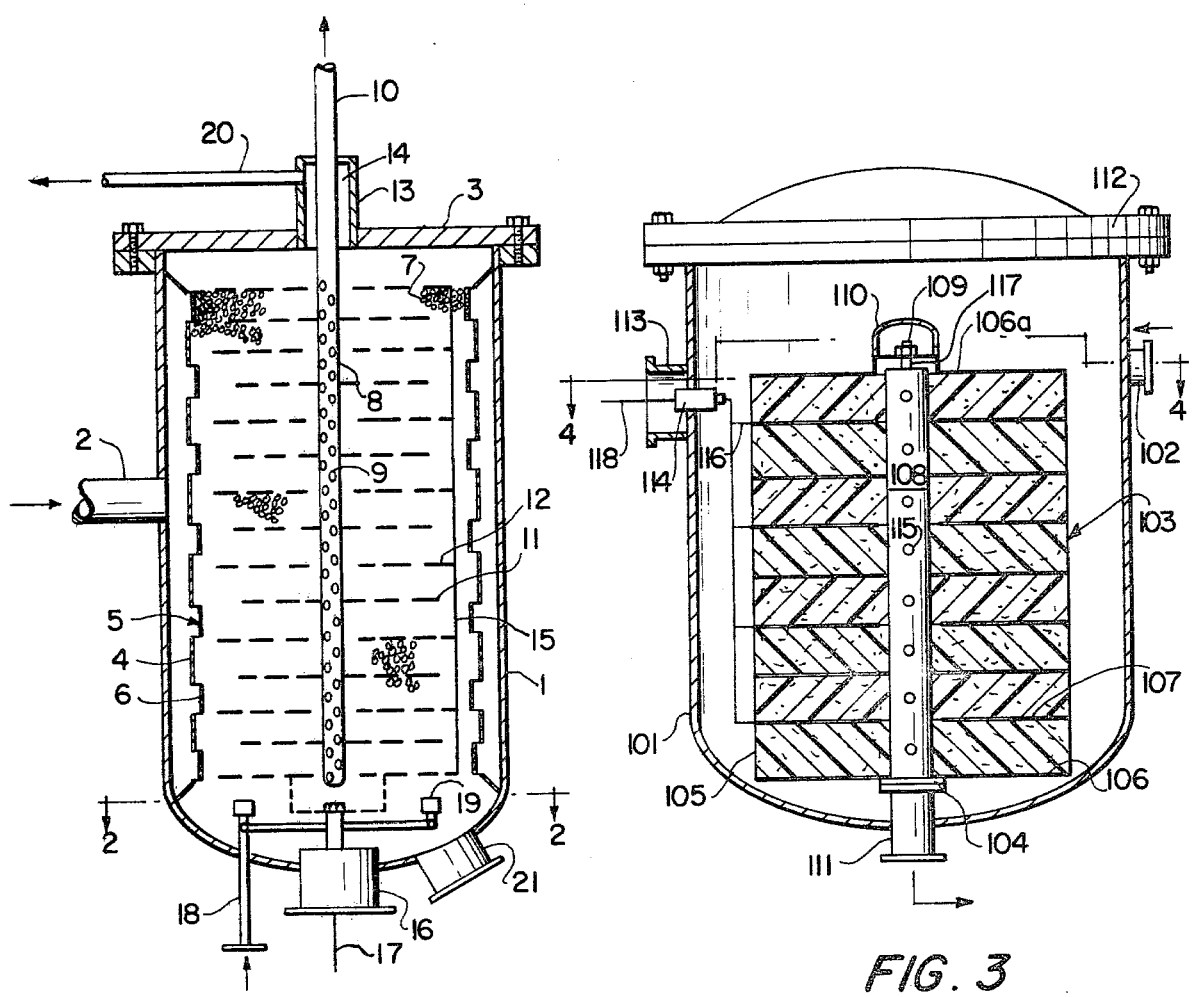
FIG. 1
FIG. 3
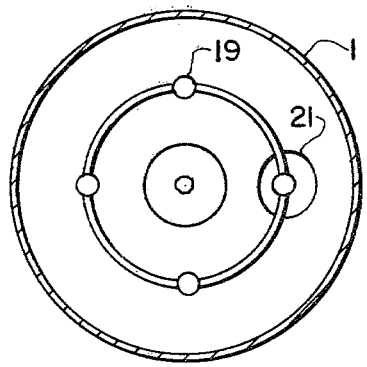
FIG. 2
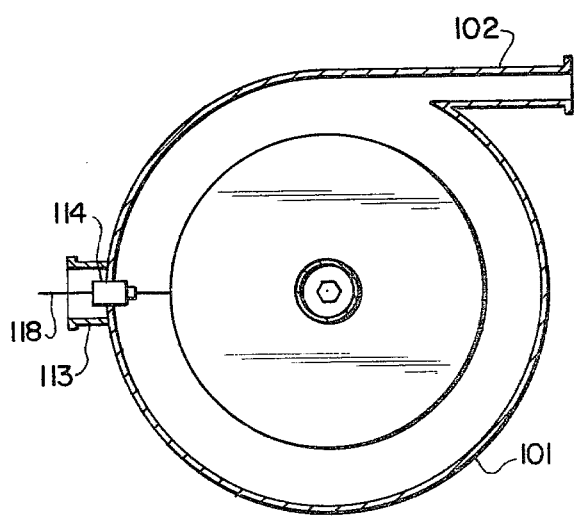
FIG. 4

0
RADIAL FLOW ELECTROFILTER

FIELD OF THE INVENTION

This invention relates to electrofiltration apparatus and to processes for electrofiltration employing such apparatus.

BACKGROUND OF THE INVENTION

It is known to remove solids from hydrocarbons and other organic liquids by the use of electrofilters. The electrofilter is a device having a filter bed of a porous medium in which an electric field is maintained by one or more energized electrodes. The electric field is of high intensity so that the solids are removed from the liquid stream by becoming tenaciously attached to the surfaces of the porous medium. Such porous medium may be, for example, a polyurethane foam or may be composed of hard granular particles.

Among the electrofilters of this general type, mention may be made of those shown in U.S. Pat. No. 3,799,856 to Franse, U.S. Pat. No. 3,891,528 to Griswold, U.S. Pat. No. 3,928,158 to Fritsche, U.S. Pat. No. 4,059,498 to Crissman et al and U.S. Pat. No. 4,040,926 to Oberton.

It is an object of this invention to provide improved electrofiltration apparatus.

It is a further object of this invention to provide a removable filter pack for an electrofiltration apparatus.

It is still an additional object of this invention to provide an efficient electrofiltration process.

Other objects of the invention will become apparent from the following description.

SUMMARY OF THE INVENTION

In accordance with this invention, there is provided an improved electrofilter for use in the removal of finely divided solids from liquids of low electrical conductivity. The electrofilter comprises a vertical cylindrical metallic vessel; a cylindrical porous bed of a dielectric filtering medium disposed centrally in said vessel, spaced apart from the walls of said vessel, thereby providing an annular space between the bed and the vessel walls; a plurality of parallel planar electrodes extending horizontally through at least a major portion of the bed; fluid inlet means to the vessel fluidly communicating with the annular space; tubular fluid collector means extending axially through at least a major portion of the porous bed; fluid outlet means fluidly communicating with the collector means; and conductor means for supplying electrical potential to at least alternately spaced said electrodes to create electric fields between adjacent electrodes. The electrofilter is either provided with backflushing means or the porous bed of a dielectric filtering medium and the planar electrodes and the tubular collector means, together with conductor means are included in a self-contained filter pack (i.e., one having no separate containment means), removably mounted centrally in the vessel.

In the preferred embodiments, an odd number of electrodes is employed and means are provided to electrically ground the topmost and bottom-most electrodes and the alternately spaced electrodes between them. The conductor means for supplying electrical potential is arranged to supply the remaining electrodes.

In one embodiment, the electrofilter of this invention includes also backflushing means, which may include a back-flush fluid inlet, a backflush fluid distributor in the bottom portion of the vessel fluidly communicating with the backflush inlet, and a backflush fluid outlet in the upper portion of the vessel. Non-deformable particles such as glass or porcelain beads or particles of a silicon dioxide containing mineral, such as those disclosed in the above referred to Oberton patent, are preferred as the dielectric filtering medium in this embodiment, although non-conductive deformable material having voids, such as open-pore polyurethane foam or nylon mesh wrapped in layers or nylon cord wrapped to create voids, may also be employed. When non-deformable particles are employed, they are disposed interiorly of a cylindrical fluid distributor.

In another embodiment, no provision is made for backflusing the filter bed, and the bed of dielectric filtering medium, the electrodes and the central collector means, together with suitable conductor means, are incorporated in a filter pack removably mounted centrally in the vessel. Non-conductive deformable material having voids, such as mentioned above, is the preferred filter medium in this embodiment, open-pore polyurethane foam, preferably compacted between the electrodes, being most preferred. In this type of arrangement, it is preferred to employ an inlet for the fluid to be treated which is tangential to the sidewall of the vessel, thereby being adapted to create a circular flow of fluid around the outside of the filter pack. Alternately, however, other distributor means, such as multiple entry points and manifolds, may be employed.

Another aspect of the invention is directed to the removable filter pack. This comprises a plurality of parallel annular planar electrodes; a central tubular collector extending through the center holes of the electrodes; alternate electrodes being in grounding electrical contact with the collector and the remaining electrodes having center holes sufficiently larger than the diameter of the collector to provide electrical clearance; conductor means for supplying electrical potential to the remaining electrodes; and annular layers of dielectric filtering material positioned between the electrodes.

Preferably, an odd number of electrodes is employed, the topmost and bottom-most electrodes and the alternately spaced electrodes between them being those in grounding electrical contact with the collector. The dielectric filter bed material is preferably a non-conductive deformable material having voids, such as mentioned above, most preferably open-pore polyurethane foam, sheets of this material preferably being compacted between the electrodes and the filter pack being self-contained.

A further aspect of the invention relates to a process for the electrofiltration of a liquid of low electrical conductivity containing finely divided solids, comprising passing the liquid in a radial direction through a cylindrical porous bed of a dielectric filtering medium, the bed being traversed by a plurality of parallel planar electrodes perpendicular to the axis of the bed and extending through at least a major portion thereof, a unidirectional, preferably continuous direct current, electric field being maintained between adjacent electrodes; discontinuing the electric fields when the bed becomes loaded with finely divided solids to the extent that filtering efficiency becomes impaired; and removing these solids from the bed by backflushing with a backflush liquid. The preferred direction of flow of the liquid being treated is from the outer periphery of the bed toward its center.

The bed in this process preferably consists of non-deformable particles, such as glass or porcelain beads or particles of a silicon dioxide containing mineral, and the electrodes are preferably permeable.

Another process embodiment of the invention is one wherein a liquid of low electrical conductivity containing finely divided solids is passed tangentially into a cylindrical vessel containing a centrally positioned cylindrical filter pack spaced apart from the walls of the vessel, thereby affecting circular flow of the liquid around the periphery of the filter pack. The liquid is caused to pass in a radial direction through the filter pack, which comprises a self-contained bed of a non-conductive deformable material having voids, traversed by a plurality of parallel planar electrodes perpendicular to the axis of the bed and extending through at least a major portion thereof. The treated liquid is collected in an axially positioned collector and then withdrawn from the vessel. A unidirectional, preferably continuous direct current, electric field is maintained between adjacent electrodes. The non-conductive deformable material is preferably polyurethane foam, preferably compacted between the electrodes.

In both process embodiments, the preferred voltage gradient ranges from 1 to 60 KV per inch and the preferred electrode spacing is from 1 to 5 inches apart. It is also preferred in each embodiment to employ an odd number of electrodes wherein the topmost and bottom-most and alternate electrodes between them are grounded and the remaining electrodes are energized.

The present processes are well adapted to the treatment of organic liquids, for example, hydrocarbon liquids. In the treatment of hydrocarbon liquids such as absorption oils and jet fuels, polyurethane foam may advantageously be used as the filtering medium.

The radial flow of the liquid being treated from the outer perimeter of the filter medium to its center, as described above, has the advantage of having the dirty oil at the outer perimeter where the radial flow is the slowest, as opposed to the center, where the flow rate is the greatest. As the rate increases with flow to the center collector, cleaner oil is being further cleaned. Radial flow in the reverse direction, i.e., from the center outward, has the disadvantage that the dirtiest oil is treated at the highest rate of flow.

It will be seen, however, that regardless of the direction of the flow, the apparatus involved may in some cases be the same. In such cases (e.g., the embodiment shown in FIGS. 1 and 2, described below), although the apparatus is described in the specification and claims employing terminology which assumes flow from the outside to the center, the apparatus would still be the same and within the intended scope of the claims if the flow were in the other direction. Similarly, although the terminology in this specification assumes operation of the apparatus in a vertical position, the apparatus can be employed in other than a vertical position since its operation in not gravity dependent.

DESCRIPTION OF SPECIFIC EMBODIMENTS

The invention is illustrated by but not limited to the exemplary embodiments described below.

Referring to the drawings:

FIG. 1 is a longitudinal vertical cross-section of one embodiment of an electrofilter of this invention incorporating backflushing means.

FIG. 2 is a transverse horizontal cross-section taken along line 2—2 of the electrofilter shown in FIG. 1.

FIG. 3 is a vertical view, mainly in cross-section, of another electrofilter of this invention, wherein a removable filter pack is employed.

FIG. 4 is a transverse horizontal section taken along line 4—4 of the electrofilter shown in FIG. 3.

FIGS. 1 and 2 show an electrofilter of this invention wherein backflushing means are provided. This filter includes a generally cylindrical metallic electrofilter vessel 1 having a fluid feed inlet 2 in the sidewall and provided with a metallic cover 3 having a centrally positioned vertical neck portion 13. Inside the vessel 1, concentric with and spaced a small distance apart from the vessel walls, is a cylindrical distributor liner 4 having meter orifices 5, which may be covered by screens or slotted covers 6. Distributor liner 4 is fastened at its top and bottom to the wall of vessel 1. Interiorly of the distributor liner 4 is a porous bed of a dielectric filtering medium 7. In the embodiment shown in this Figure, the preferred filter medium is glass or porcelain beads, although other types of non-deformable dielectric particles may be employed, such as those disclosed in Oberton U.S. Pat. No. 4,040,926. The screens or slotted covers 6 serve to keep these particles from plugging the orifices 5. Less preferred in this embodiment are open-pore polyurethane foam, nylon and other non-conductive materials having voids.

The distributor liner 4 and screens or slotted covers 6 may be metallic or non-metallic. The orifices 5 are located in that portion of the distributor liner 4 opposite to what may be termed the main treating zone, that is the zone between the topmost and bottom-most electrodes 12. A tubular collector 8, preferably metallic, having meter orifices 9 is centrally positioned within vessel 1 and extends most of the height of the vessel. A tubular extension 10 of the collector 8, lacking the meter orifices 9, extends through the vessel cover 3 and serves as the product outlet. A plurality of planar electrodes 11 and 12 extend horizontally through the porous bed 7. These electrodes are annular in shape with central holes large enough for the outlet collector 8 to pass through. As shown in FIG. 1, the electrodes 11 and 12 are permeable, being formed of expanded metal or other open material. However, all the electrodes except the topmost and bottom-most electrodes 12 may also be of solid construction, although these are less desirable because they would present obstruction to backflushing, described below. As shown in FIG. 1, there are an odd number of electrodes, of which electrodes 11 are at ground potential, and electrodes 12, alternating with electrodes 11, and including the topmost and bottom-most electrodes, are energized. Electrodes 11 are in contact, mechanically and electrically, with outlet collector 8, which in the preferred embodiment is metallic and in electrical communication with vessel 1 by way of the neck portion 13 of cover 3. An annular space 14 exists between outlet collector 8 and the sidewall of neck portion 13. Energized electrodes 12, mechanically and electrically separated from collector 8, are connected together as by a metal conductor, such as a wire or rod 15, and supported as a unit by entrance bushing and support 16, which, as shown here, extends centrally through the bottom of vessel 1. As shown in the drawing, electrodes 12 are larger in diameter than electrodes 11 so that they can be connected to conductor 15 while providing electrical clearance for grounded electrodes 11. Alternatively, electrodes 11 and 12 may be made the same diameter and tabs provided on electrodes 12 to provide for the necessary connections and clearances. An electrical conductor 17 passing through entrance bushing 16 connects outside vessel 1 with a direct current power supply, not shown, and inside vessel 1 with the energized electrode assembly (electrodes 12 and conductor 15).

As shown in the drawing, the top 3 of vessel 1 serves as an upper grounded electrode and a backflush inlet header 18 and communicating fluid distributor outlets 19, at the bottom of vessel 1, serve as bottom grounded electrode.

Instead of the topmost and bottom-most electrodes 12 being energized, these and alternate electrodes can be made to serve as grounded electrodes, with the remaining electrodes energized. Also, both sets of electrodes may be energized and separate power sources may be employed for this purpose. Although an odd number of electrodes is preferred so that the topmost and bottom-most electrodes are at the same potential, an even number may also be employed down to a minimum of two. The only essential is that an electric field may be maintained between adjacent electrodes.

The fluid inlet header 18 for backflushing purposes extends through the bottom of vessel 1 and communicates fluidly with fluid distributor outlets 19. These outlets are preferably slotted to prevent the particles of the filter medium from plugging them. Suitable for this purpose are Johnson Well Screens ®. Annular space 14 serves as an outlet annulus for the backflush fluid, being provided with an outlet conduit 20. A pump out drain 21 is provided in the bottom portion of vessel 1. If the intermediate electrodes (all but the topmost and bottom-most electrodes 12) are of solid construction, the backflushing path will be suitably modified.

In operation, a raw liquid feed containing finely divided solid particles is introduced into vessel 1 through feed inlet 2 and passes through the orifices 5 of the distributor 4 and then in a generally radial direction through the filter medium 7 to the outlet collector 8. During its passage through the medium 7, the feed is subjected to the action of a continuous direct current or other unidirectional current electric field between adjacent electrodes, the result of which is that the finely divided solid particles separate from the feed and are retained in the medium.

The liquid product of this operation passes through the orifices 9 of the collector 8 and upwardly through the collector and its tubular extension 10 which serves as the product outlet conduit.

When the filter medium 7 becomes loaded with the separated solids to the extent that the efficiency of the filter is impaired, the filter bed is backflushed with a suitable flushing fluid, such as a raw feed stream or other stream which can be recycled back into processing or ortherwise disposed of while containing the contaminant. This fluid is introduced through backflush inlet header 18 and distributor outlets 19 and passes upwardly through the filter medium 7 and the perforations of electrodes 11 and 12, i.e., transversely through the electrodes, and into the annular space 14, from which it exits by means of backflush outlet conduit 20.

The spacing between the electrodes and the voltage employed are interrelated. In general, these are set so that a voltage gradient in the range of 1 KV to 60 KV per inch is achieved, the latter figure being about the limit for commercial power supplies. It is possible to design and use equipment with higher potentials, but after 75 KV these are costly. The potential gradient chosen will depend on the nature of the solids in the feed. The electrodes are ordinarily spaced from 1" to 5" apart, as required to achieve the desired potential gradient, taking into consideration the power supply capability.

FIGS. 3 and 4 illustrate an electrofilter of this invention employing a removable filter pack and having no provision for backflushing. This filter includes a generally cylindrical metallic electrofilter vessel 101 having a fluid feed inlet 102 in its sidewall and provided with a removable cover 112. Occupying most of the interior of vessel 101 is a centrally positioned removable cylindrical filter pack 103, resting on a flange 104 of a product outlet conduit 111, which passes through the bottom of the vessel. The filter pack 103 is secured to flange 104 by a quick disconnect device, not shown.

Filter pack 103 comprises a centrally positioned vertical metallic fluid outlet collector 108, provided with orifices 115, alternating grounded and energized annular planar electrodes, 106 and 107, respectively, which may suitably be made of solid aluminum plate, and layers of open-pore polyurethane foam 105 between adjacent electrodes. The number of such layers between adjacent electrodes is not indicated in the drawing. The construction of the filter pack will be made clear by the following description of a preferred procedure for assembling it.

The polyurethane foam layers are cut from sheets of foam in an annular shape. An electrode 106, next to flange 104, is securely fastened to the outlet collector 108 through which it is grounded. One or more layers of foam 105 is inserted over the collector 108 and rests on the bottom electrode 106. An annular electrode 107 with tab 116 for electrical connection is then slipped over the collector 108 and positioned on the foam layers 105, the central hole in the electrode being sufficiently larger than the diameter of the collector 108 to provide for the required electrical clearance. One or more additional layers of foam 105 is inserted and another grounded electrode 106 is inserted over collector 108. This continues up to the topmost grounded electrode 106a which is secured to a stud 117 projecting from the top closed end of collector 108 by means of a nut 109. The central portion of electrode 106a may be shaped as required for this purpose. Top electrode 106a is made to compact and compress the entire pack against the bottom electrode 106 by tightening nut 109. A cover 110 is provided over nut 109 to prevent bypassing of fluid around the nut.

Collector 108 may be made of an insulating material such as polyvinyl chloride instead of metal, but in that case, electrodes 106 and 106a must be electrically tied together and taken to a ground potential at the vessel. Electrodes 107 in that case may touch collector 108 without shorting out.

An electrical entrance bushing 114 in a flanged housing 113 in the side wall of vessel 101 provides the means of introducing an electrical conductor 118 into the vessel. Conductor 118 is connected to each of the energized electrodes 107 at the tabs 116.

The operation of the embodiment of FIGS. 3 and 4 is generally similar to that of FIGS. 1 and 2. A raw liquid feed containing finely divided solids is introduced into vessel 101 through feed inlet 102 and passes in a generally radial direction through the polyurethane layers 105 to the outlet collector 108. During its passage through the polyurethane layers 105, the feed is subjected to the action of a direct current electric field between electrodes, the result of which is that the finely divided solids separate from the feed and are retained in the polyurethane. The liquid product of this operation passes through the orifices 115 of the collector 108 and downwardly through the collector to outlet conduit 111.

When the polyurethane layers 105 become loaded with separated solids to the extent that the efficiency of the filter is impaired, the filter pack 103 may be removed and replaced. The removed pack 103 may be discarded or cleaned and reused.

The comments regarding the spacing of the electrodes and the voltages employed made in connection with the filter of FIG. 1 apply to the filter of FIG. 2 also.

A 30 gallons per minute filter pack for the filter of FIGS. 3 and 4 may suitably be 20" in diameter and 24" deep, with 3" spacing between adjacent electrodes filled with 20 pore per inch polyurethane foam. The central outlet collector 108 may suitably be formed from a 4" diameter pipe. The vessel housing such a filter pack may suitably have dimensions of 30" O.D.×23¼" shell length. The filter is suitably powered by a 5 KVA power supply and may be fitted with an automatically controlled outlet valve to shut upon high amperage or power failure.

An electrofilter of this invention employing 20 pore per inch open-pore polyurethane foam was tested on absorption oil used in a refrigerated absorption plant for LPG recovery from pipeline gas. The absorption oil used in this process is contaminated by "pipeline dust". These solids cause corrosion and poor heat exchange efficiency. Evaluation studies indicated that a 60-90% removal of these solids is possible using the electrofilter of our invention.

In the evaluation studies, a module which was 1/60 of the 30 gpm electrofilter referred to above (same diameter but 1/60 of the electrode depth) was employed. This module duplicated the spacing, gradient and fluid flow anticipated for the 30 gpm filter. Four drums of contaminated absorption oil, two from one plant unit and two from another, were run through the module in once through flow at ½ gpm, the flow being from the outside radially toward the central 4" diameter collector. The samples from the first unit analyzed 25 mg./gal. solids and contained 1.0 mg/gal. after treatment, a 96% removal. The samples from the other unit analyzed 47 mg./gal. and contained 2.0 mg/gal. after treatment, likewise a 96% removal. The total loading on the filter element was 5.4 grams after the four drums were treated.

The equipment was then set up for a continual recycle of the oil, with the contaminants retained from two previous samples being gradually added to the oil. This was continued until the filter medium was loaded with all available contaminants, estimated to be 10.7 grams total. The voltage was stable at 30 KV and 0 ma. The filter pack was removed from the system and washed to recover the solids from the medium. These weighed 10.2 grams. The foam weight was 61 grams. Other testing has shown an allowable loading on foam to be 1 to 2 times its weight. The filter element can be cleaned easily outside the vessel. The contaminants wash off with a jet spray of clean absorption oil.

The following is a semi-quantitative spectrographic analysis of the contaminant solids, which analyzed 75.30% ash.

TABLE 1

SEMI-QUANTITATIVE SPECTROGRAPHIC ANALYSIS

| Element | Approximate %, on Ashed Basis |
|---|---|
| Aluminum | 0.2 |
| Barium | Trace |
| Calcium | 0.3 |
| Chromium | 0.2 |
| Copper | 0.5 |
| Iron | 63 |
| Lead | 0.2 |
| Magnesium | 0.06 |
| Manganese | 0.3 |
| Molybdenum | 0.02 |
| Nickel | 0.1 |
| Silicon | 3 |
| Strontium | Trace |
| Tin | Trace |
| Titanium | 0.2 |
| Zinc | 0.5 |

Test were also carried out using a 24" diameter by 12" high electrofilter equipped with three parallel planar electrodes with layers of 20 pores per inch open-pore polyurethane foam compacted between them. The middle electrode was energized and the upper and lower electrodes grounded by way of a central tubular collector. The liquid feed was introduced centrifugally into an annular space provided between the wall of the filter vessel and the periphery of the electrode-foam assembly. The treated liquid was withdrawn from an outlet at the bottom of the tubular collector. The feed was passed through the filter at the rate of 25 gpm. Jet fuel from two different sources, artificially contaminated with a contaminant composed of 1 part $Fe_2O_3$, 1 part fine Arizona Road Dust and 1 part of Air Filter Test Dust, were employed as feeds. The further conditions and results of the tests are shown in the following table.

TABLE 2

| Test | 1 | 2 | 3 | 4 | 5 | 6 | 7 | 8 |
|---|---|---|---|---|---|---|---|---|
| Fuel | PR(a) | GOC(b) | GOC | GOC | GOC | GOC | GOC | GOC |
| Temp., °F. | 85 | 80 | 78 | 78 | 80 | 78 | 78 | 78 |
| Inlet Solids |  |  |  |  |  |  |  |  |
| Mg/gal. | 30 | 30 | 30 | 30-45 | 30 | 30 | 40 | 45 |
| Packing |  |  |  |  |  |  |  |  |
| No. of layers(c) | 20 | 24 | 20 | 24 | 1 | 1 | 16 | 24 |
| Porosity, PPI | 20 | 20 | 20 | 20 | 20 | 40 | 40 | 20 |
| Grams | 304 | 374 | 306 | 440 | 308 | 361 | 364 | 352 |
| Grad. KV/Inch | 30 | 30 | 30 | 60 | 60 | 60 | 60 | 60 |
| Current, Ma. | 0.45 | 0.28 | 0.07 | 0.2 | 0.02 | 1.2 | 0.02 | 0.25 |
| Grams of Solids added before 1st visible residue in product Equivalent gals. | 145 | 20 | 30 | 520 | 0 | 20 | 130 | 450 |

TABLE 2-continued

| Test | 1 | 2 | 3 | 4 | 5 | 6 | 7 | 8 |
|---|---|---|---|---|---|---|---|---|
| of fuel containing 10 mg/gal. solids | 14500 | 2000 | 3000 | 52000 | 0 | 2000 | 13000 | 45000 |
| % Loading | 48 | 5.4 | 9.8 | 120 | 0 | 5.6 | 36 | 125 |

(a)Jet fuel in Petreco supply tank.
(b)Hydrofined jet fuel from Gulf Oil Co., Port Arthur
(c)Between adjacent electrodes It will be seen from Table 2 that a multitude of foam layers between adjacent electrodes yields better results than a single thick sheet of foam, even when the voltage gradient is increased. Accordingly, the use of multiple layers is preferred. The weight of foam in place is indicative that the compression factors were comparable.

It will be evident that the foregoing description is illustrative of, rather than limitative upon, the invention as defined by the appended claims and that various changes and modifications can be made in the apparatus and methods exemplified without departing from the spirit of the invention.

We claim:

1. An electrofilter for removal of finely divided solids from liquids of low electrical conductivity comprising:
   (a) a vertical cylindrical metallic vessel;
   (b) cylindrical fluid distributor means concentric with and spaced apart from said vessel;
   (c) a porous bed of a dielectric filtering medium disposed interiorly of said cylindrical fluid distributor means;
   (d) a plurality of annular parallel planar electrodes extending horizontally through at least a major portion of said bed, all said electrodes being permeable;
   (e) fluid inlet means to said vessel fluidly communicating with said annular space;
   (f) tubular fluid collector means extending axially through at least a major portion of said bed;
   (g) fluid outlet means fluidly communicating with said central tubular collector means; and
   (h) conductor means for supplying electrical potential to at least alternately spaced said electrodes to create electric fields between adjacent electrodes; said electrofilter being provided with backflushing means adapted to cause backflushing fluid to pass transversely through the electrodes, said backflushing means comprising:
   (i) backflush inlet means;
   (j) backflush fluid distributor means in the bottom portion of said vessel fluidly communicating with said backflush fluid inlet means; and
   (k) backflush fluid outlet means in the upper portion of said vessel.

2. An electrofilter of claim 1 wherein an odd number of said parallel planar electrodes is employed, comprising also means for electrically grounding the topmost and bottom-most electrodes and the alternately spaced electrodes between them, said conductor means (h) for supplying electrical potential to at least alternately spaced electrodes being arranged to supply the remaining electrodes.

3. An electrofilter of claim 1 wherein said dielectric filtering medium consists of non-deformable particles.

4. The electrofilter of claim 3 wherein said non-deformable particles are glass or porcelain beads or particles of a silicon dioxide containing mineral.

5. A process for the electrofiltration of a liquid of electrical conductivity containing finely divided solids comprising passing said liquid in a radial direction through a cylindrical porous bed of a dielectric filtering medium, said bed being traversed by a plurality of parallel planar permeable electrodes perpendicular to the axis of said bed and extending through at least a major portion thereof, a unidirectional current electric field being maintained between adjacent electrodes; discontinuing said electric fields when said bed becomes loaded with finely divided solids to the extent that filtering efficiency becomes impaired; and removing said finely divided solid from said bed by backflushing it with a backflushing liquid, said backflushing liquid being passed transversely through the electrodes.

6. The process of claim 5 wherein the direction of flow of said non-conductive liquid containing finely divided solid particles is from the outer periphery of said bed toward its center.

7. The process of claim 6 wherein said bed consists of non-deformable particles.

8. The process of claim 7 wherein said non-deformable particles are glass or porcelain beads or particles of a silicon dioxide containing mineral.

9. The process of claim 6 wherein said unidirectional current electric field is a continuous direct current field.

10. The process of claim 9 wherein a voltage gradient between 1 and 60 KV is employed and the electrodes are spaced from 1 to 5 inches apart.

11. The process of claim 6 wherein an odd number of electrodes are employed.

12. The process of claim 11 wherein the topmost and bottom-most electrodes and the alternate electrodes between them are at ground potential and the remaining electrodes are energized.

* * * * *

UNITED STATES PATENT AND TRADEMARK OFFICE
CERTIFICATE OF CORRECTION

PATENT NO. : 4,302,310

DATED : November 24, 1981

INVENTOR(S) : Frederick D. Watson, Weldon D. Mayse, Albert D. Franse

It is certified that error appears in the above—identified patent and that said Letters Patent are hereby corrected as shown below:

Column 10, line 22, after the second occurrence of "of", insert

--- low ---

Signed and Sealed this

Fourth Day of May 1982

[SEAL]

Attest:

Attesting Officer

GERALD J. MOSSINGHOFF

Commissioner of Patents and Trademarks